US009799218B1

(12) United States Patent
Gordon

(10) Patent No.: US 9,799,218 B1
(45) Date of Patent: Oct. 24, 2017

(54) PREDICTION FOR LANE GUIDANCE ASSIST

(71) Applicant: Robert Gordon, Plainview, NY (US)

(72) Inventor: Robert Gordon, Plainview, NY (US)

( * ) Notice: Subject to any disclaimer, the term of this patent is extended or adjusted under 35 U.S.C. 154(b) by 0 days.

(21) Appl. No.: 15/288,333

(22) Filed: Oct. 7, 2016

Related U.S. Application Data

(60) Provisional application No. 62/333,352, filed on May 9, 2016, provisional application No. 62/342,532, filed on May 27, 2016.

(51) Int. Cl.
*G08G 1/09* (2006.01)
*G08G 1/16* (2006.01)
*G08G 1/0967* (2006.01)

(52) U.S. Cl.
CPC ......... *G08G 1/09* (2013.01); *G08G 1/096775* (2013.01); *G08G 1/167* (2013.01)

(58) Field of Classification Search
None
See application file for complete search history.

(56) References Cited

U.S. PATENT DOCUMENTS

| 5,420,794 | A | 5/1995 | James |
| 5,504,482 | A | 4/1996 | Schreder |
| 5,689,252 | A | 11/1997 | Ayanoglu et al. |
| 5,875,412 | A | 2/1999 | Sulich et al. |
| 6,141,710 | A | 10/2000 | Miesterfeld |
| 6,298,302 | B2 | 10/2001 | Walgers et al. |
| 6,314,360 | B1 | 11/2001 | Becker |
| 6,466,862 | B1 * | 10/2002 | DeKock ............... G08G 1/0104 340/901 |
| 6,700,505 | B2 | 3/2004 | Yamashita et al. |
| 6,853,915 | B2 | 2/2005 | Hubschneider et al. |
| 6,868,331 | B2 | 3/2005 | Hanebrink |
| 6,873,908 | B2 | 3/2005 | Petzold et al. |
| 7,317,973 | B2 | 1/2008 | Dieterle |
| 7,421,334 | B2 | 9/2008 | Dahlgren et al. |
| 7,471,212 | B2 | 12/2008 | Krautter et al. |
| 7,483,786 | B1 | 1/2009 | Sidoti et al. |

(Continued)

OTHER PUBLICATIONS

Brian Smith and Ramkumar Venkatanarayana, System Operations Data Integrity Assessment, University of Virginia Center for Transportation Studies Report No. UVACTS-14-5-129, Jun. 25, 2007.

(Continued)

*Primary Examiner* — Mussa A Shaawat
*Assistant Examiner* — Kyung Kim
(74) *Attorney, Agent, or Firm* — Law Offices of Leo Mikityanskiy, P.C.; Leonid Mikityanskiy

(57) ABSTRACT

The automated lane management assist method, data structure and system receive unprocessed lane-specific limited-access highway information, including lane use and speed limits, from traffic detectors in the roadway or from other sources, process and develop predicted information from these sources and substitute the predicted information for the current information where appropriate, thus improving the timeliness of the information in a form that assists in the selection of driving lanes and target speeds for vehicles, including in partially and fully automated vehicles, and communicate the processed predicted information to the vehicles by suitable means.

20 Claims, 4 Drawing Sheets

Heavy line —— encloses ALMA modules

(56) References Cited

U.S. PATENT DOCUMENTS

| | | | |
|---|---|---|---|
| 7,590,489 | B2 | 9/2009 | Auger et al. |
| 7,593,813 | B2 | 9/2009 | Hahlweg et al. |
| 7,725,250 | B2 | 5/2010 | Bisdikian et al. |
| 7,930,095 | B2 | 4/2011 | Lee |
| 7,974,772 | B2 | 7/2011 | Nitz et al. |
| 8,099,236 | B2 | 1/2012 | Olson et al. |
| 8,103,435 | B2 | 1/2012 | Yang et al. |
| 8,155,865 | B2 | 4/2012 | Bicego, Jr. |
| 8,234,064 | B2 | 7/2012 | Oonishi |
| 8,311,727 | B2 | 11/2012 | Eckstein et al. |
| 8,326,474 | B2 | 12/2012 | Schrey et al. |
| 8,332,132 | B2 | 12/2012 | Groenhuijzen et al. |
| 8,346,430 | B2 | 1/2013 | Przymusinski et al. |
| 8,706,417 | B2 | 4/2014 | Zeng et al. |
| 9,053,636 | B2 | 6/2015 | Gordon |
| 9,208,682 | B2 | 12/2015 | Fowe et al. |
| 9,211,891 | B2 | 12/2015 | Scofield et al. |
| 9,257,041 | B2 | 2/2016 | Scofield et al. |
| 9,286,800 | B2 | 3/2016 | Gordon |
| 9,299,251 | B2 | 3/2016 | Scofield et al. |
| 2004/0246147 | A1 | 12/2004 | von Grabe |
| 2004/0249562 | A1 | 12/2004 | Tsuge et al. |
| 2005/0131627 | A1 | 6/2005 | Ignatin |
| 2005/0192033 | A1 | 9/2005 | Videtich |
| 2006/0069496 | A1 | 3/2006 | Feldman et al. |
| 2006/0247844 | A1 | 11/2006 | Wang et al. |
| 2007/0208492 | A1 | 9/2007 | Downs et al. |
| 2008/0114530 | A1* | 5/2008 | Petrisor ............ G08G 1/096716 701/117 |
| 2009/0287401 | A1 | 11/2009 | Levine et al. |
| 2010/0256898 | A1 | 10/2010 | Gassner |
| 2012/0083995 | A1 | 4/2012 | Vorona |
| 2014/0358414 | A1* | 12/2014 | Ibrahim ................ G01C 21/10 701/118 |

OTHER PUBLICATIONS

Shawn Turner, Rich Margiotta and Tim Lomax, Monitoring Urban Freeways in 2003: Current Conditions and Trends from Archived Operations Data, Federal Highway Administration Report No. FHWA-HOP-05-018, Dec. 2004.

Chuck Fuhs, Synthesis of Active Traffic Management Experiences in Europe and the United States, FHWA Report No. FHWA-HOP-10-031, May 2010.

Jerome M. Lutin, Alain L. Kornhauser, and Eva Lerner-Lam, "The Revolutionary Development of Self-Driving Vehicles and Implications for the Transportation Engineering Profession" ITE Journal, vol. 83 No. 7, Jul. 2013.

Robert Kelly and Mark Johnson, Legal Brief, Thinking Highways, North American Edition, Oct. 2012.

Donald A. Redelmeier and Robert J. Tibshirani, Are Those Other Drivers Really Going Faster?, Chance, vol. 13, No. 3, 2000.

Kazi Iftekhar Ahmed, Modeling Drivers 'Acceleration and Lane Changing Behavior, Doctoral Thesis, MIT, Feb. 1999.

S.M. Chin, O. Franzese, D.L Greene, and H.L Hwang, Temporary Loss of Highway Capacity and Impacts on Performance, Phase 2, Oak Ridge National Laboratory, Nov. 2004.

Suzanne E. Lee, Erik C.B. Olsen, and Walter W. Wierwille, A Comprehensive Examination of Naturalistic Lane Changes, USDOT Report No. DOT HS 809702, Mar. 2004.

Bei Pan, Ugur Demiryurek, and Cyrus Shahabi, Utilizing Real-World Transportation Data for Accurate Traffic Prediction, Integrated Media System Center, University of Southern California.

Jan D. Gehrke and Janusz Wojtusiak, A Natural Induction Approach to Traffic Prediction for Autonomous Agent-based Vehicle Route Planning, Machine Learning and Inference Laboratory, MLI 08-1, George Mason University, Feb. 17, 2008.

Moshe Ben-Akiva, Michel Bierlaire, Haris Koutsopoulos, and Rabi Mishalani, DynaMIT: a simulation-based system for traffic prediction, Massachusetts Institute of Technology Intelligent Transportation Systems Program, Presented Paper presented at the DACCORD Short Term Forecasting Workshop Feb. 1998.

Sherif Ishak and Ciprian Alecsandru, Optimizing Traffic Prediction Performance of Neural Networks under Various Topological, Input, and Traffic Condition Settings, JTE'04, vol. 130.

Junqing Wei and John M. Dolan, A Robust Autonomous Freeway Driving Algorithm, IEEE 2009.

* cited by examiner

PREDICTION FOR LANE GUIDANCE ASSIST

CROSS REFERENCE OF RELATED APPLICATIONS

This patent application is a nonprovisional patent application of and claims priority from the provisional patent application Ser. No. 62/333,352 filed on May 9, 2016, and this patent application also claims the benefit of the provisional patent application Ser. No. 62/342,532 filed on May 27, 2016, both of which are hereby incorporated by reference in their entirety.

FIELD OF THE INVENTION

This invention was not made pursuant to any federally-sponsored research and/or development.

A prior invention (Management Center Module for Advanced lane Management Assist—U.S. Pat. No. 9,053, 636) provides a method and system for assisting the drivers of vehicles, and the intelligent in-vehicle systems in partially and fully automated vehicles to select a specific lane for vehicle travel on limited access highways as well as a recommended speed. That patent employs current lane specific information from traffic detectors in the roadway or from other sources. The present invention develops predicted information from these sources and substitutes it for the current information where appropriate, thus improving the timeliness of the information.

BACKGROUND

This patent application extends the usefulness of the following two prior patents, the disclosures of which are hereby incorporated by reference in their entirety, as if fully set forth herein:

U.S. Pat. No. 9,053,636 Management Center Module for Advanced Lane Management Assist for Automated Vehicles and Conventionally Driven Vehicles (ALMAMC)

U.S. Pat. No. 9,286,800 Guidance Assist Vehicle Module (ALMAVM)

These patents describe a methodology (ALMA) for using traffic management center (TMC) information to select a most appropriate freeway lane for a driver or automated vehicle and to provide a target speed for that lane. The TMC traffic condition information, is essentially current information on traffic speed and other variables for each through traffic lane. The information is organized according to a data structure described in in the ALMAMC patent that considers the physical and functional features of the freeway as well as traffic information devices. The information is transmitted to the vehicle where it is further processed (ALMAVM). This additional processing develops guidance on the best lane and target speed by looking at traffic speeds for several miles ahead (downstream) of the vehicle's current position.

Since the vehicle may not reach the look-ahead distance for a few minutes, the current patent improves the performance of the prior patents by using predicted traffic speed in place of current traffic speed for lane selection and target speed recommendations. To obtain lane based speed information, TMCs may use sources such as roadway based traffic detectors and reports from connected vehicles that include position, speed and lane identification. Prediction for other key parameters provided by the ALMAMC patent is provided.

Pan et al[1] provide a review of traffic prediction techniques. Examples of prediction techniques include:

[1] BEI PAN, UGUR DEMIRYUREK, and CYRUS SHAHABI, Utilizing Real-World Transportation Data for Accurate Traffic Prediction, Integrated Media System Center, University of Southern California.

1. Simulation Models—Traffic prediction using microscopic simulation models in conjunction with traffic detector measurements. References include Gehrke and J. Wojtusiak[2] and Ben Akiva et al[3].

[2] JAN D. GEHRKE and JANUSZ WOJTUSIAK, A Natural Induction Approach to Traffic Prediction for Autonomous Agent-based Vehicle Route Planning, Machine Learning and Inference Laboratory, MLI 08-1, George Mason University, Feb. 17, 2008.
   [3] MOSHE BEN-AKIVA, MICHEL BIERLAIRE, HARTS KOUTSOPOULOS, and RABI MISHALANI, DynaMIT: a simulation-based system for traffic prediction, Massachusetts Institute of Technology Intelligent Transportation Systems Program, Presented Paper presented at the DACCORD Short Term Forecasting Workshop February, 1998.

2. Data Mining Techniques—This class analyzes the data collected by traffic detectors. Various analysis approaches include:

A. Auto-Regressive Integrated Moving Average (ARIMA) Model.[4] The Exponential Smoothing model is a special case of ARIMA that has been extensively used for traffic data applications. Strictly speaking these models are just estimators of current conditions that are used as predictors. Although not discussed by Pan, The ALMAMC software uses a Kalman Filter in this manner to process lane specific information developed by the TMC from traffic detectors and other sources.

[4] G. BOX and G. JENKINS, Time series analysis: Forecasting and control. San Francisco: Holden-Day, 1970 (book).

B. Neural Network Models have been used for traffic prediction[5] as have genetic algorithms.

[5] SHERIF ISHAK and CIPRIAN ALECSANDRU, Optimizing Traffic Prediction Performance of Neural Networks under Various Topological, Input, and Traffic Condition Settings, JTE'04, Volume 130.

C. Historical Models—These models process historical data and provide prediction by reference to a future time period.

Pan concludes that he ARIMA/Exponential Smoothing models are best for short term prediction (our interest) and that historical models are best for long term prediction. Pan provides an algorithm based on error characteristics to select between them.

SUMMARY OF THE INVENTION

The ALMAMC patent provides traffic speeds and other traffic variables according to a geographically related data structure described in the patent. The current patent replaces these current variables with predicted values when the prediction is estimated to be sufficiently accurate. Prediction periods are typically two minutes in duration, and typically predictions for three such periods may be provided, for a total prediction time of typically up to six minutes.

Prediction is provided in the current patent only when historic and current traffic conditions and estimated errors indicate that the prediction is likely to be accurate. When these conditions are not present, current traffic variables as provided by the processes in the ALMAMC patent are used.

The ALMAMC patent provides for filtering of the TMC traffic detector lane speed data. Occupancy and volume data if available are similarly processed. As an example, that patent describes the filter process using Kalman Filters. In ALMAMC, only the current values of these quantities are employed.

An example of the prediction methodology (ALMAPR) that may be used in the current patent and described in some detail is to use the predictive capability of Kalman Filters to predict the future lane based values of speed, volume and occupancy for the first prediction period and to extrapolate the rate of speed, volume and occupancy change into subsequent prediction periods. The estimate of the error in the current traffic variables is provided by the Kalman Filter and is used by the ALMAPR patent to assist in determining when the use of prediction is appropriate. Other data characteristics are also used for this purpose.

It is an object of the present invention to achieve, provide and facilitate Prediction for Lane Guidance Assist to supplement and/or replace modules in the ALMAMC and ALMAVM patents as follows:

- Short term prediction of lane-specific traffic parameters including speed and others for providing guidance for the selection of a preferred lane and target speed for that lane; Such data is used by the ALMAVM module but may be used for other lane selection processes.
- Utilizing traffic management centers (TMCs), an ALMA Management Center and/or other information sources as possible data sources for the prediction model.
- Prediction traffic parameters may conform to a data structure described in the ALMAMC patent.
- Process checks may be performed for the quality of the predicted data; if the predicted data is not of sufficient quality, current data is substituted. Quality checks may include periods when changes in speed are high, data is erratic, estimation error is excessive and data that may be affected by traffic incidents. The predicted data may be an improvement over the current data because the predicted data is available in advance.
- Predictions are provided in prediction time intervals of appropriate duration.
- Provides average predicted lane speeds for vehicles or drivers for a look ahead (downstream) distance from the vehicle.

BRIEF DESCRIPTION OF THE DRAWINGS

The features, aspects and advantages of the novel Prediction for Lane Guidance Assist will become further understood with reference to the following description and accompanying drawings where.

DESCRIPTION

Introduction. ALMA as described in U.S. Pat. No. 9,053,636 (ALMAMC) and 9,286,800 (ALMAVM) provides information to conventional and partly or fully automated vehicles to enable them to respond to freeway lane selection and target speed selection information originating from a freeway traffic management center in a way that is superior to the way that an unaided human driver or automated vehicle would respond to that information. The disclosures of these patents describe how speed, volume and occupancy information collected at a traffic management center (TMC) is processed by the ALMA Management Center (AL-MAMC) and transmitted to the vehicle. Using this information in conjunction with routing, speed and location information supplied by the vehicle and information from the vehicle operator, the ALMA Vehicle Module (ALMAVM) recommends the most appropriate freeway lane and a target speed for that lane.

Figure 1:
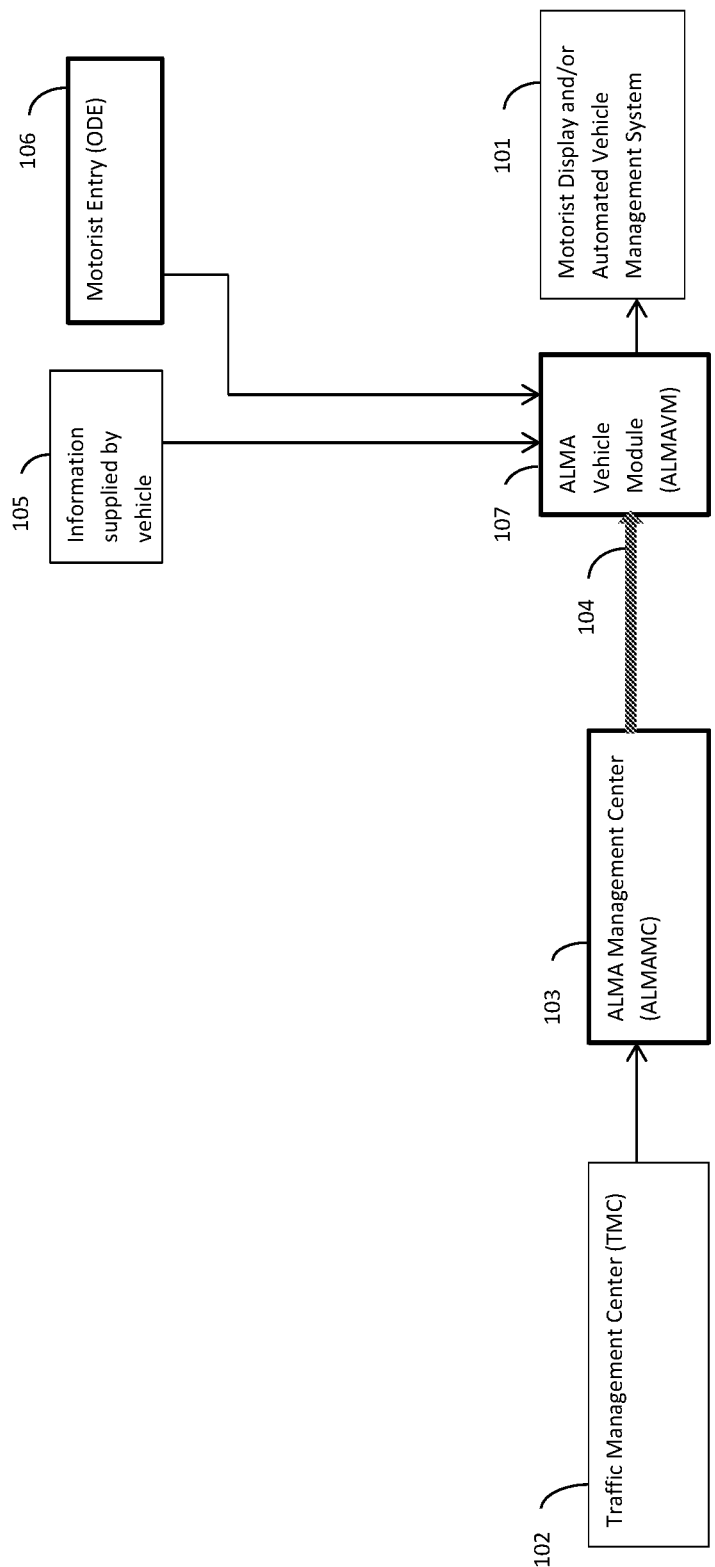
FIG. 1 is the flowchart of the ALMA simplified data flow.
Figure 2:
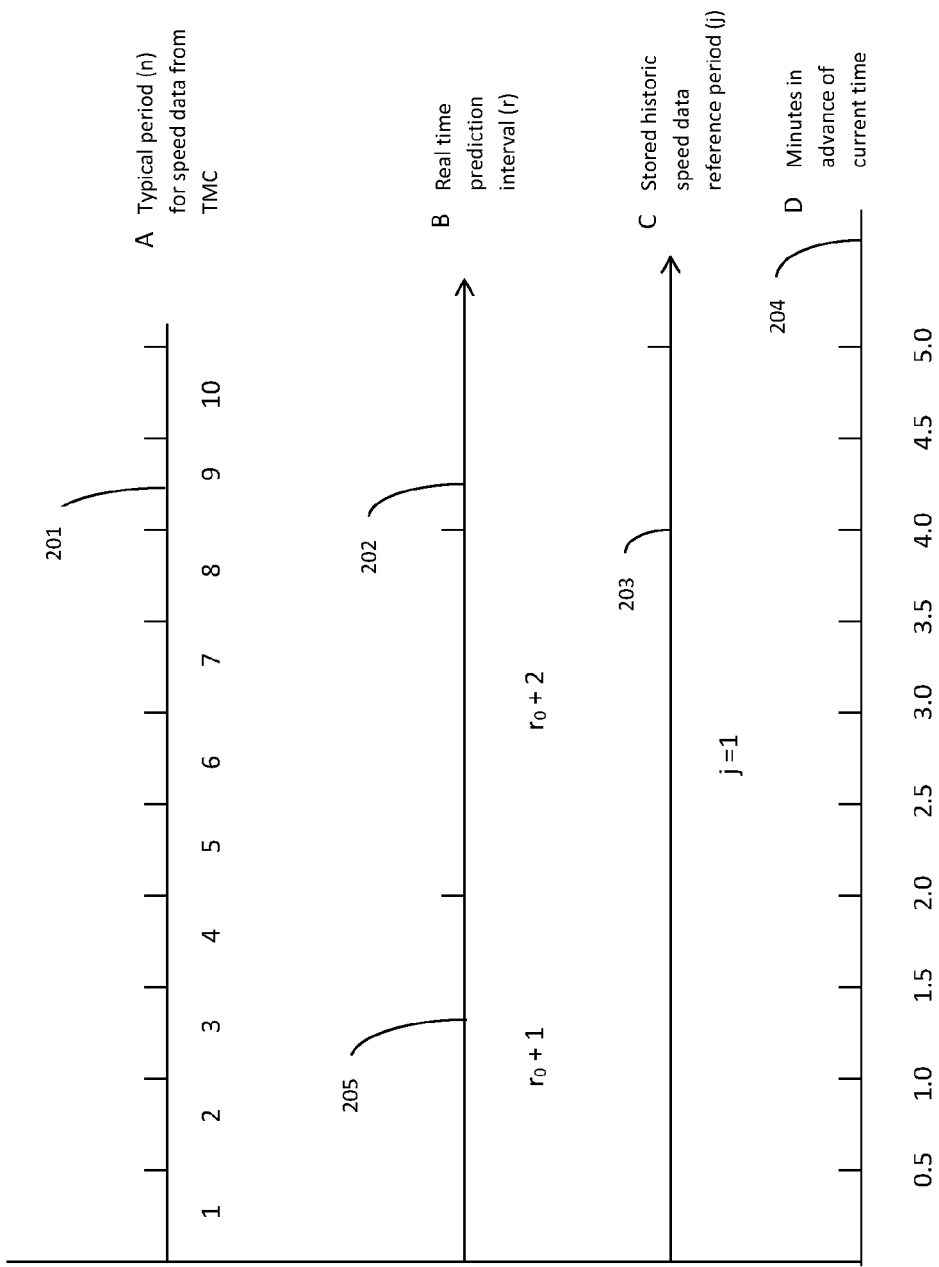
FIG. 2 is the graphical representation of Key Time Sequence Relationships.

FIG. 2 of the existing ALMAMC patent illustrates the ALMA architecture. FIG. 1 shows a simplified view of this architecture. Using roadway traffic sensors or other means to detect individual vehicles, a traffic management center (TMC) 102 develops traffic data such as speed, volume and occupancy. TMCs also detect and manage traffic incidents and provide traffic information to motorists by means of roadway devices such as dynamic message signs (DMS) and other means. The ALMA traffic management center 103 further processes this information, organizes it and transforms it using a prescribed data structure as described in the ALMAMC patent. Processed traffic parameters suitable for the presentation of lane conditions and other information are the transmitted by means of a communication system 104 such as a smartphone with an appropriate vehicle head unit. This information is used by the ALMA Vehicle Module 107 in conjunction with vehicle position, speed and routing information from the vehicle 105 and driving preferences and other information from the motorist 106 to provide recommended lane and target speed information to the motorist display and/or the partially or fully automated vehicle management system 101.

The ALMAMC patent also describes the geometric data structure to which the data is referenced. In summary, the freeway is divided into barrels and zones. A barrel represents a set of travel lanes in a roadway. It is physically or functionally separated from other parallel lane sets. Barrel boundaries are determined by changes in the physical roadway configuration and by permanent changes along the roadway in the regulatory use of the roadway or its lanes. A barrel is divided into zones. Zone boundaries are determined by a number of factors including traffic conditions, placement of motorist information devices and regulatory devices that provide changeable information.

The existing ALMAMC patent provides information based on its estimate of current traffic conditions. The current patent provides this information based on short term predictions of traffic conditions. This will improve performance under some traffic conditions. The geometric data structure of the ALMAMC patent is preserved in the current patent application.

The current ALMAPR patent application describes a set of modules that replace certain ALMAMC and ALMAVM modules when confidence in the prediction accuracy is high. These are described in the following sections. The ALMAMC modules to be replaced include five outputs in Table 3 of the ALMAMC patent. These are described in Appendix B. Appendix A identifies the symbols used in this patent. Essentially the new functions use the prediction feature of the Kalman Filter for the prediction period that follows the current period. An extrapolation process provides prediction for subsequent prediction periods.

For predictive purposes, the computation of the number of look-ahead zones and the look ahead speed is more complex that for Modules 4.3R.2.5 and 4.3R.2.6 of the ALMAVM patent. These modifications are described in subsequent sections of this patent.

Temporal Relationships. The current patent (ALMAPR) predicts traffic variables for several future time periods. FIG. 2 shows the relationship among the key time sequences employed. Horizontal axis D 204 is a time scale that relates the other horizontal axes to clock time.

The top horizontal axis (A) 201 represents the intervals (n) after the current interval for which the data is received by the ALMAMC from the TMC. It is represented as one half minute in the figure although some TMCs may provide different intervals. The second horizontal axis (B) 202 represents the periods (r) for which ALMAPR will predict the speed. The duration of these periods is shown as two minutes in the figure.

As will be subsequently described, ALMAPR employs historic traffic speed data. The third horizontal axis (C) 203 represents the time periods (j) for which the historic data is compiled from TMC data. Five minute intervals as shown are typically employed.

The current patent ALMAPR provides a major addition to the modules in the ALMAMC and ALMAVM patents. This addition provides:

The type of traffic parameter outputs shown in Table 3 of the ALMAMC patent in the form of predicted parameters. The current patent's outputs are shown in Appendix B.

Modifications to the spatial-temporal data structure in the ALMAVM patent to enable the predicted traffic parameters to be effectively employed in the vehicle.

Example of Prediction Process.

Figure 3:
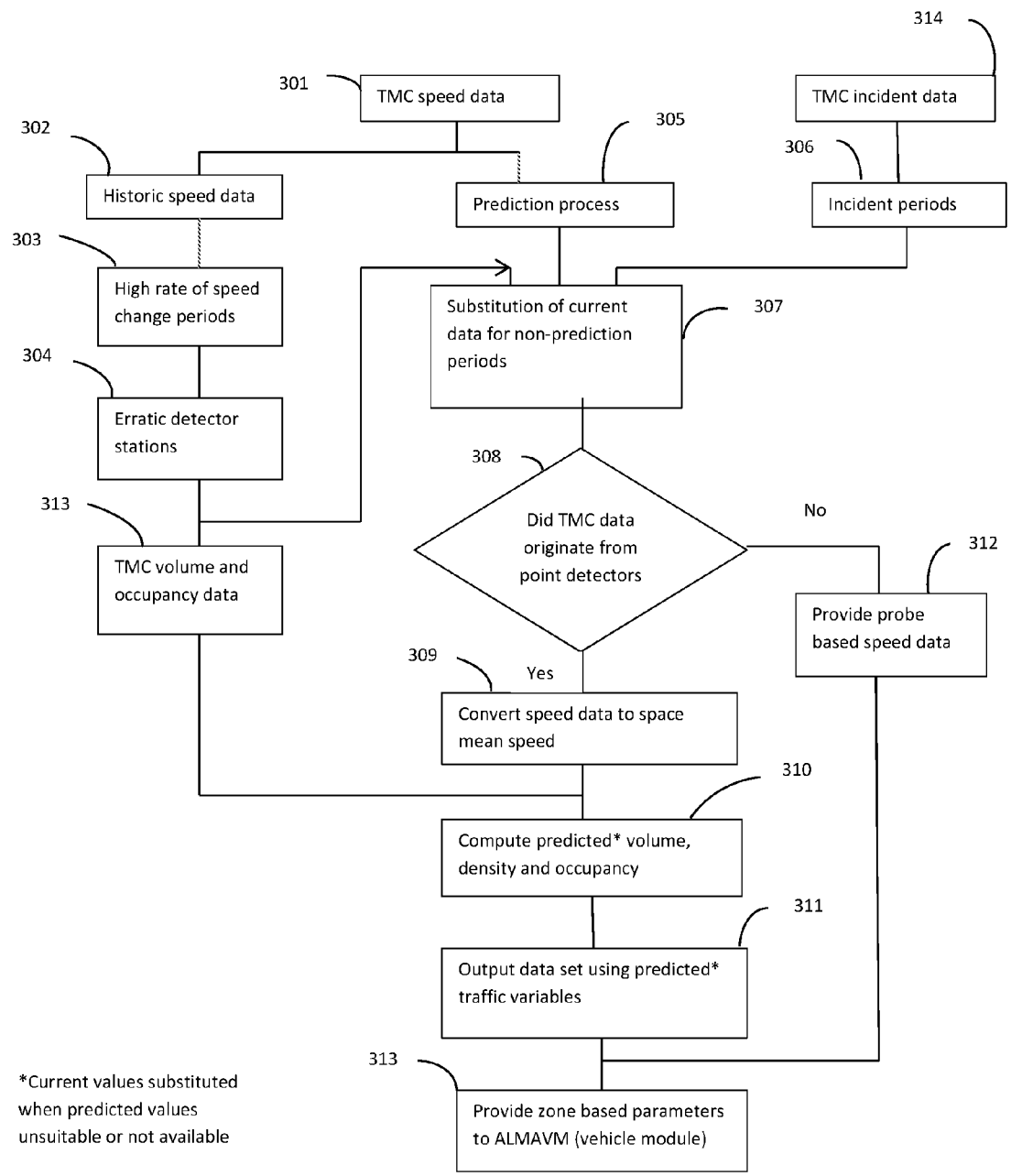
FIG. 3. Is ALMA Management Center Flow Chart for Additions Required by ALMAPR.

As described earlier, a number of prediction concepts may be used. An example of the prediction process, and the constraints on its use, is described in the following discussion with the assistance of FIG. 3.

The speed data SPINT(Z,L,) from the TMC 301 is averaged into stored historic data reference periods (j) 203.

In the Historic Speed Data process 302, averages for the most recent K3 days are obtained for each time period for weekdays, and weekend days. Exception days (days excluded from the averaging period) may be identified by the ALMAMC manager.

The historic data is processed for the purpose of eliminating Kalman prediction data 305 for periods that history has shown to be unsuitable. This includes:

Periods when changes in the speed in a zone averaged over all lanes exceed a threshold value (K2) render Kalman prediction unsuitable 303.

Detector stations that frequently provide erratic data 304. These stations can be identified when the total number of stored daily periods (j) for which the average zone speed change exceeds K5 for representative days is greater than K4.

Similar to the process described for the ALMAMC patent the prediction process uses a Kalman Filter process 305 to estimate the current speed (SPFIL(Z,L,r)). See, for example Welch, G and T R Bishop, "An Introduction to the Kalman Filter", University of North Carolina Department of Computer Science, TR 95-041, 2006.

The prediction process in this patent modifies the estimation process in the ALMAMC patent as follows. Prediction for the first prediction interval $r_0+1$ 205 and designated as SPFILPR(B,Z,L,$r_0+1$) is available from the Kalman iteration that follows the estimate for the current interval. Prediction for subsequent prediction intervals ($r>r_0+1$) will be performed by using the rate of change of speed for interval r+1 for the subsequent intervals. The rate of speed change is computed as $$RSC=(SPFIL(B,L,Z,r)-SPFIL(B,L,Z,r-1))/LR$$

where LR is the duration of the prediction interval (r)

The predicted speed when converted to space-mean-speed is designated as

SPSPPR(B,Z,L) for all prediction intervals.

The estimation error for speed (SPE(L,Z,r)) for the current interval is used in module 307.

Module 306 interprets incident related information from the TMC to identify the presence of an incident. The module identifies zones affected by the incident. This information is sent to Module 307.

Under certain conditions the predicted value for speed may be unreliable. Module 307 substitutes the current value of zone speed (SPFILTOT(Z,r)) for each lane for the values for the prediction intervals when the following conditions are present:

Speed estimation error (SPE(L,Z,r) exceeds an acceptable threshold K6.

Zone employs a detector station that provides erratic data (304).

Zones affected by an incident have been identified (306).

As described in the ALMAMC patent, lane based data that originates from point detectors can be processed to provide key fundamental traffic parameters such as volume and occupancy (which may be further processed to provide density.) TMC data that originates from such sources as infrastructure based probes or vehicle based sensors working in conjunction with vehicle to infrastructure communications cannot be effectively processed in a similar manner because all of the necessary variables cannot be measured by these techniques. Module 308 controls the steps that implement this distinction.

If the TMC speed data originated from point detectors, Module 308 directs the computation to a path that will provide the additional parameters described in the ALMAMC patent (Module 6 and Table 3).

Module 309 converts the predicted time mean speed originating from point detectors to predicted space mean speed using the relationship shown in Equation 8 of the ALMAMC patent.

Predicted volume and occupancy 310 are computed by Kalman Filters in the prediction mode similar to that used to compute time mean speed. Predicted density 310 is computed using the relationships in Appendix B and predicted compensated occupancy 310 is computed using Equation 10 of the ALMAMC patent in conjunction with the prediction processes described for speed in the current patent.

The relationships required to compute the remaining parameters 311 (predicted average headway, predicted average vehicle length, predicted passenger car equivalent volume) identified in Table 3 of the ALMAMC patent are computed as shown in Appendix B.

When point detectors are used as the data source, the full parameter set is provided to the ALMAVM module in the vehicle 313. When other types of information (such as probe based information) are used as the data source 312, only predicted space mean speed is provided to the ALMAVM module 313.

Spatial—Temporal Relationships.

The prior discussion describes the additions to the ALMA Management Center required to support predictive capability. The following discussion describes additions and modifications to the ALMA Vehicle Module required to support prediction.

ALMAVM identifies the number of downstream zones that should be employed to estimate a "look ahead" speed (ALMAVM Module 4.3R.2.5). In that module, the look ahead speed is calculated as the current speed for each zone weighted by the length of each zone.

Where predicted speeds are used in place of current speeds, it becomes necessary to identify the appropriate time interval to be used for traversing each zone. An approach for doing this is described with the assistance of FIG. 4. The solid line represents the time-space plot of a vehicle after it enters the first look ahead zone. The slope of each segment of the trace represents the average speed of the vehicle for that zone and prediction interval. This slope changes as the vehicle traverses each zone in the look ahead distance. The first segment shown in the FIG. 401 uses the speed for Zone Z+1 for the current time interval. The line segment 402 for the first prediction interval (r+1) lies entirely within zone Z+1. Table 1 shows the predicted speed to be used for each trace segment to fully develop a similar figure for each vehicle. In this way each line segment serves as the base for the next line segment when this process is completed, the value for look ahead time (LAT(L)) is obtained.

TABLE 1

Predicted Speed for Vehicle

| | Look ahead zones | | |
|---|---|---|---|
| Time interval | Z + 1 | Z + 2 | Z + 3 |
| Current interval $r_0$ | Slope of segment 401 | | |
| Prediction Interval $r_0$ + 1 | Slope of segment 402 | | |
| Prediction Interval $r_0$ + 2 | Slope of segment 403 | Slope of segment 404 | Slope of segment 405 |
| Prediction Interval $r_0$ + 3 | | | Slope of segment 406 |

Figure 4:
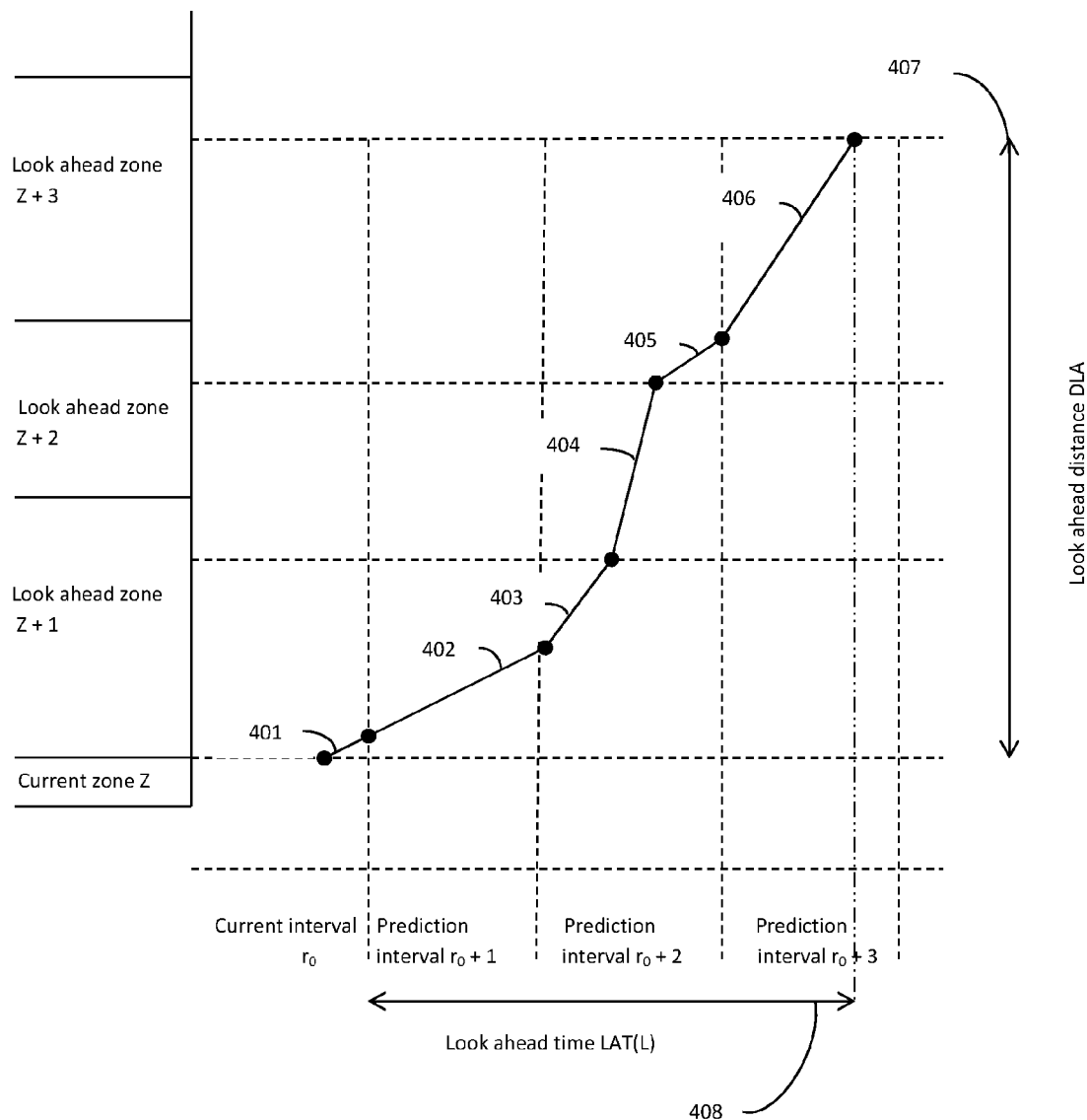
FIG. 4 is Example of Look Ahead Time Development Process.

These concepts will be used to replace Module 4.3R.2.6 in the GAVM program. In that module ZWAS(L) represents the look ahead speed for each lane using current zone speeds. The predictive replacement is provided by the expression:

$$ZPWAS(L) = DLA/LAT(L)$$

where DLA is the look ahead distance 407 shown in FIG. 4 and LAT(L) is the look ahead time 408 for lane L.

APPENDIX A

Definition of Symbols

| Symbol | Definition |
|---|---|
| AHWPR(B,Z,L) | Predicted average headway |
| AVL | Average vehicle length |
| d | Detection zone |
| DENFILPR (B,Z,L) | Predicted lane density |
| DLA | Look ahead distance |
| F | Scaling coefficient |
| j | Stored historical period |
| K2 | Threshold for excessive changes in speed |
| K3 | Number of averaging days |
| K4 | Limit on number of prediction intervals for which speed change is unsuitable |
| K5 | Threshold for speed change unsuitability |
| K6 | Acceptable estimated error for speed |
| LAT(L) | Predicted look ahead time |
| LL | Length of detector sensing area in lane |
| LR | Duration of prediction interval |
| NOPREDDAYCLASS(d) | Detection zones to be eliminated because of erratic data |
| OCCFILPR (Det,L) | Predicted occupancy |
| PCE | Passenger car equivalent volume |
| PCEPR (B,L,Z) | Predicted passenger car equivalent volume |
| r | Computation and prediction interval |
| $r_0$ | Current interval |
| RSC | Rate of speed change |
| SPE(L,Z,r) | Estimated error in speed |
| SPFIL(L,Z,r) | Kalman filtered lane speed |
| SPFILTOT(Z,r) | Filtered speed for all through lanes in zone |
| SPINT(Z,L) | Speed by lane from TMC |
| SPSPPR(B,Z,L) | Predicted lane speed |
| VOLFIL(BZL) | Filtered detector volume in TMC reference |
| VOLFILPR(B,Z,L) | Predicted lane volume |
| Z | Zone |
| ZPWAS(L) | Predicted look ahead speed |
| ZWAS(L) | Look ahead speed using current speed |

APPENDIX B

ALMAPR Output Parameters

When appropriate as described in this patent the parameters shown inn Table B1 are provided using the equations that follow the table. The background for these equations is the same as that provided for Equations 8, 9, 18, 19 and 20 in the ALMAMC patent. Symbol definitions are provided in Appendix A.

TABLE B1

ALMAPR output parameters from the ALMA Management Center

| Traffic Parameter | Detectors with Accurate Volume and Occupancy Data | Detectors with Accurate Volume and Speed Data (may or May Not Include Accurate Occupancy Data) |
|---|---|---|
| Predicted Lane Volume (vehicles/hr) | VOLFILPR(B,Z,L) — Volume prediction process output converted to ALMA data structure | VOLFILPR(B,Z,L) — Volume prediction process output converted to ALMA data structure |
| Predicted Average Headway (hours/vehicle) | AHWPR(B,Z,L) = 1/VOLFILPR(B,Z,L) converted to ALMA data structure | AHWPR(B,Z,L) = 1/VOLFILPR(B,Z,L) converted to ALMA data structure |
| Predicted Passenger Car Equivalent Volume | PCEPR (B,L,Z) — Equation B1 converted to ALMA data structure | PCEPR (B,L,Z) — Equation B1 converted to ALMA data structure |
| Predicted Lane Speed | SPSPPR(B,Z,L) — Equation B3 converted to ALMA data structure | SPSPPR(B,Z,L) — Speed prediction process (307, 308, 309) converted to ALMA data structure |

TABLE B1-continued

ALMAPR output parameters from the ALMA Management Center

| Traffic Parameter | Detectors with Accurate Volume and Occupancy Data | Detectors with Accurate Volume and Speed Data (may or May Not Include Accurate Occupancy Data) |
|---|---|---|
| Predicted Lane Density | DENFILPR (B,Z,L) — Equation B4 converted to ALMA data structure | DENFILPR (B,Z,L) — Equation B2 |

Equations $$PCEPR(Det,L) = PCE*VOLFILPR(B,Z,L)/VOLFIL(B,Z,L) \quad \text{B1}$$

$$DENFILPR(B,Z,L) = VOLFILPR(B,Z,L)/SPSPPR(B,Z,L) \quad \text{B2}$$

$$SPSPPR(B,Z,L) = VOLFILPR(B,Z,L)/DENFILPR(B,Z,L) \quad \text{B3}$$

$$DENFILPR(Det,L) = (F*OCCFILPR(Det,L))/(LL+AVL(Det,L)) \quad \text{B4}$$

What is claimed is:

1. A method of assisting in selection of driving lanes and target speeds for vehicles, comprising the steps of:
   a. receiving unprocessed lane-specific limited-access highway data from a traffic management center (TMC), or another data source;
   b. combining the unprocessed lane-specific limited-access highway data with data from a static database to create intermediate lane-specific limited-access highway data;
   c. generating processed predicted lane-specific limited-access highway data from the intermediate lane-specific limited-access highway data, said processed predicted lane-specific limited-access highway data conforming to a temporal and/or spatial data structure comprising barrels divided into zones, wherein boundaries of the barrels are defined by physical roadway configuration changes and permanent changes in regulatory use of the limited-access highway lanes and wherein boundaries of the zones are defined by changes in traffic conditions along the limited-access highway resulting from entry ramps and exit ramps and locations of motorist information devices and regulatory devices that provide changeable information and active traffic management control of the limited-access highway; and
   d. providing the processed predicted lane-specific limited-access highway data to one or more vehicles, wherein said processed predicted lane-specific limited-access highway data is visually or audibly presented in the one or more vehicles, said processed predicted lane-specific limited-access highway data enabling an in-vehicle guidance assist vehicle module of the one or more vehicles to select a preferred lane and target speed for the preferred lane using a copy or a subset of the static database.

2. The method of claim 1, wherein the step of providing the processed predicted lane-specific limited-access highway data to the one or more vehicles is dynamic.

3. The method of claim 1, wherein the in-vehicle guidance assist vehicle module uses the processed predicted lane-specific limited-access highway data to develop lane selection and target speed selection.

4. The method of claim 1, wherein the processed predicted lane-specific limited-access highway data provided to the in-vehicle guidance assist vehicle module includes one or more of lane volume, lane passenger car equivalent volume, lane average headway, lane density, lane speed, vehicle length by lane, static and dynamic regulatory lane-use data.

5. The method of claim 1, wherein appropriate information decision zones relating to roadway geometrics and roadway traffic information devices are established, and wherein the processed predicted lane-specific limited-access highway data corresponding to the information decision zones is provided to the one or more vehicles sufficiently in advance of an action required by the one or more vehicles or a vehicle operator of the one or more vehicles to facilitate safe lane changes and speed adjustments in conformance with individual motorist driving preferences.

6. The method of claim 1, further comprising using the processed predicted lane-specific limited-accessed highway data in conjunction with software in the one or more vehicles.

7. The method of claim 1, further comprising using the processed predicted lane-specific limited-accessed highway data in conjunction with data provided by the one or more vehicles.

8. The method of claim 1, further comprising using the processed predicted lane-specific limited-accessed highway data in conjunction with data provided by an occupant of the one or more vehicles.

9. The method of claim 8, wherein the data provided by the occupant of the one or more vehicles includes one or more of vehicle characteristics, vehicle passenger occupancy, highway use preferences, and toll preferences.

10. The method of claim 1, further comprising periodically providing the data from the static database according to the roadway zone based data structures to the one or more vehicles to update the copy or the subset of the static database in the one or more vehicles.

11. The method of claim 1, wherein the processed predicted lane-specific limited-access highway data includes one or more of lane based traffic parameter data, TMC traffic incident report data, lane blockage information, lane closure information, limitations on lane use, shoulder information, regulatory lane use data, scheduled roadway closures, dynamic speed limits, current lane speed, volume and occupancy vehicle detector data, camera data, vehicle class based lane restrictions, vehicle overheight restrictions, vehicle overweight restrictions, vehicle occupant requirements, and toll information to assist in the generation of lane selection information and the target speed information for vehicles.

12. The method of claim 1, wherein the processed predicted lane-specific limited-access highway data is generated based on one or more factors selected from the group consisting of traffic information, limitations on lane use, shoulder information, regulatory lane use data, scheduled roadway closures, toll information, dynamic speed limits, current lane speed, volume and occupancy vehicle detector data, camera data, vehicle class, vehicle overheight restrictions, vehicle overweight restrictions, vehicle occupant calls, and toll information.

13. The method of claim 1, further comprising performing one or more quality check of the processed predicted lane-specific limited-access highway data and substituting current lane-specific limited-access highway data for the predicted lane-specific limited-access highway data if the processed predicted lane-specific limited-access highway data is not of sufficient quality.

14. A non-transitory computer-implemented roadway zone based data structure for expressing predicted traffic parameters, incident data, regulatory data and toll information in geographical segments that are appropriate for limited-access highway lane selection and target speed selection for the chosen lanes, said data structure comprising:
   a. at least one interface for receiving unprocessed lane-specific limited-access highway data from a traffic management center; and
   b. a processor coupled to the at least one interface, wherein the processor receives the unprocessed lane-specific limited-access highway data through the at least one interface, processes the unprocessed lane-specific limited-access highway data, generates processed predicted lane-specific limited-access highway data conforming to a temporal and/or spatial data structure comprising barrels divided into zones, wherein boundaries of the barrels are defined by physical roadway configuration changes and permanent changes in regulatory use of the limited-access highway lanes and wherein boundaries of the zones are defined by changes in traffic conditions along the limited-access highway resulting from entry ramps and exit ramps and locations of motorist information devices and regulatory devices that provide changeable information and active traffic management control of the limited-access highway and transmits processed predicted lane-specific limited-access highway data to at least one vehicle in a form appropriate for limited-access highway lane selection and target speed selection for the chosen lanes, wherein the processed predicted lane-specific limited-access highway data is visually or audibly presented in the at least one vehicle.

15. The data structure of claim 14, further comprising a computer storage for storing processed predicted lane-specific limited-access highway data, wherein the processor receives the unprocessed lane-specific limited-access highway data through the at least one interface, processes the unprocessed lane-specific limited-access highway data, and outputs processed predicted lane-specific limited-access highway data to the computer storage in a form appropriate for limited-access highway lane selection and target speed selection for the chosen lanes.

16. The data structure of claim 15, wherein the processed predicted lane-specific limited-access highway data is transmitted to the at least one vehicle from the computer storage.

17. A system for assisting in selection of driving lanes and target speeds for vehicles, comprising:
   a. an interface for receiving unprocessed lane-specific limited-access highway data from a traffic management center (TMC), advanced lane management assist management center (ALMAMC), or another data source;
   b. a processor coupled to the interface, wherein the processor receives the unprocessed lane-specific limited-access highway data through the interface, processes the unprocessed lane-specific limited-access highway data, generates processed predicted lane-specific limited-access highway data conforming to a temporal and/or spatial data structure comprising barrels divided into zones, wherein boundaries of the barrels are defined by physical roadway configuration changes and permanent changes in regulatory use of the limited-access highway lanes and wherein boundaries of the zones are defined by changes in traffic conditions along the limited-access highway resulting from entry ramps and exit ramps and locations of motorist information devices and regulatory devices that provide changeable information and active traffic management control of the limited-access highway, and transmits processed predicted lane-specific limited-access highway data to one or more vehicles, wherein the processed predicted lane-specific limited-access highway data is visually or audibly presented in the at the one or more vehicles; and
   c. one or more of a lane closure guidance module, lane and speed limit requirements module, dynamic lane use requirements module, toll information module, module for checking detector values for accuracy, module for formatting traffic data, miscellaneous data module, and static database module, said one or more module operatively coupled to the processor for developing driving lane and target speed selection.

18. A system of claim 17, further comprising a computer storage for storing the processed predicted lane-specific limited-access highway data, said computer storage being coupled to the processor, wherein the processor receives the unprocessed lane-specific limited-access highway data through the interface, processes the unprocessed lane-specific limited-access highway data, and outputs the processed predicted lane-specific limited-access highway data to the computer storage.

19. A system of claim 18, further comprising a transmitter operatively coupled to the computer storage for transmitting the processed predicted lane-specific limited-access highway data to the one or more vehicles.

20. A system of claim 17, wherein the processor performs one or more quality check of the processed predicted lane-specific limited-access highway data and substitutes current lane-specific limited-access highway data for the processed predicted lane-specific limited-access highway data if the processed predicted lane-specific limited-access highway data is not of sufficient quality.

\* \* \* \* \*